(12) United States Patent
Chen et al.

(10) Patent No.: US 8,484,402 B2
(45) Date of Patent: Jul. 9, 2013

(54) DATA TRANSMISSION INTERFACE AND ELECTRONIC DEVICE USING THE SAME

(75) Inventors: Chuan-Wen Chen, Hsinchu Hsien (TW); Chia-Jung Chang, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 229 days.

(21) Appl. No.: 13/025,660

(22) Filed: Feb. 11, 2011

(65) Prior Publication Data
US 2011/0285377 A1  Nov. 24, 2011

(30) Foreign Application Priority Data
May 20, 2010  (TW) .............................. 99116096 A

(51) Int. Cl.
*G06F 13/20* (2006.01)
*G06F 13/00* (2006.01)

(52) U.S. Cl.
USPC .................. 710/313; 710/62; 710/18; 710/14

(58) Field of Classification Search
USPC .................. 710/313–316, 14, 18, 62; 713/300
See application file for complete search history.

(56) References Cited

U.S. PATENT DOCUMENTS

| 7,096,435 B2 * | 8/2006 | Hanson et al. ................. 716/137 |
| 2011/0285377 A1 * | 11/2011 | Chen et al. ..................... 323/318 |

* cited by examiner

*Primary Examiner* — Christopher Shin
(74) *Attorney, Agent, or Firm* — Edell, Shapiro & Finnan, LLC

(57) ABSTRACT

A data transmission interface, for coupling to an external apparatus, including a first signal transmission line and a second signal transmission line, for transmitting a differential signal, a first resistor and a voltage-variable component, selectively connected to the first signal transmission line, and a second resistor, connected to the second signal transmission line, wherein, when the data transmission interface is coupled to the external apparatus, the voltage-variable component is connected to the first signal transmission line, and the first signal transmission line presents a first voltage in response to the external apparatus.

16 Claims, 4 Drawing Sheets

DATA TRANSMISSION INTERFACE AND ELECTRONIC DEVICE USING THE SAME

CROSS REFERENCE TO RELATED PATENT APPLICATION

This patent application is based on Taiwan, R.O.C. patent application No. 099116096 filed on May 20, 2010.

FIELD OF THE INVENTION

The present invention relates to a data transmission interface and an electronic device thereof, and more particularly, to the data transmission interface that distinguishes a type of a data transmission interface via which the electronic device is connected to an electronic apparatus, and the electronic apparatus using the data transmission interface.

BACKGROUND OF THE INVENTION

Presently, mobile phones or portable electronic devices such as PDAs, navigators, etc., are usually connected to chargers or PC devices via USB interfaces. FIG. 1 is a schematic diagram of a circuit structure of an electronic device utilizing the USB interface of the prior art. As shown in FIG. 1, the electronic device 100 communicates and connects to a charger 109 via a USB interface 102. The USB interface 102 usually comprises four lines: a power line 101 ($V_{Bus}$), a ground line 103, a DP signal transmission line 105, and a DN signal transmission line 107. The power line 101 and the ground line 103 are used for supplying power to electronic devices when the electronic devices are coupled to the charger 109 via the USB interface 102. Detailed operations of the USB interface are well-known to those skilled in the art and are therefore omitted herein.

FIG. 2 is a schematic diagram of an electronic device coupled to a PC device or a charger. As shown in FIG. 2, the electronic device 100, a mobile phone in the example, may be coupled to a PC device 205 or the charger 109 via the USB interface 102. The two ends of the USB interface 102 may be plugs of different specifications, for example, one end is USB plug 209 (Mini A USB) while the other end is USB plug 211 (Type A USB), or plugs of the same specification, i.e. both are Mini A USB or both are Type A USB. The USB plug 209 is utilized for connecting to the electronic device 100, while the USB plug 211 is utilized for connecting to the PC device 205 or the charger 109, thus, a mechanism is needed for distinguishing whether the electronic device 100 is coupled to the PC device 205 or the charger 109. With reference again to FIG. 1, and taking a conventional charger as an example, a detection circuit 111 is usually added to the charger 109 for assisting the electronic device 100 using the USB interface 102 to distinguish whether the electronic device 100 is coupled to a PC device or to a charger. That is to say, additional designs for circuits are needed, which results in not only increase of costs, but also inconvenience for users, because electronic devices produced by different companies can not share the same detection circuit in the charger.

SUMMARY OF THE INVENTION

It is therefore a primary objective of the claimed invention to provide a data transmission interface and an electronic device using the same, capable of distinguishing the electronic apparatus coupled to the electronic device.

An embodiment of the present invention provides a data transmission interface, for coupling to an external apparatus, comprising a first signal transmission line and a second signal transmission line, for transmitting a differential signal, a first resistor and a voltage-variable component, alternatively connected to the first signal transmission line, and a second resistor, connected to the second signal transmission line, wherein, when the data transmission interface is coupled to an external apparatus, the voltage-variable component is connected to the first signal transmission line, and the first signal transmission line presents a first voltage according to the external apparatus, accordingly.

Another embodiment of the present invention provides an electronic device comprising a signal line pair, comprising two signal lines, for transmitting a differential signal, a pair of boost resistors, respectively connected to one of the corresponding signal line of the signal line pair while transmitting the differential signal, and a voltage-variable component, alternatively connected to one of the signal line of the signal line pair, for distinguishing the type of the apparatus while the electronic device is coupled to an external apparatus initially. Wherein, when the electronic device is coupled to the external apparatus, the voltage-variable component is connected to the signal line connected to the voltage-variable component, which presents a first voltage in response to the external apparatus.

Another embodiment of the present invention provides a method for data transmission, comprising transmitting a differential signal via a data transmission interface, comprising a first signal transmission line and a second signal transmission line, connecting a voltage-variable component to the first signal transmission line while the data transmission interface is coupled to an external apparatus, wherein the first signal transmission line presents a corresponding voltage in response to a type of the apparatus, and connecting the first signal transmission line to a first resistor and disconnecting the first signal transmission line from the voltage-variable component, after the corresponding voltage is presented in the first signal transmission line.

According to the embodiments described above, the present invention is capable of distinguishing a type of the electronic apparatus coupled to the electronic device without any external circuit in the charger and, furthermore, the present invention can switch the signal transmission line of the electronic device after the type of the apparatus is confirmed, enabling the electronic device to operate in a normal state.

The advantages and spirit related to the present invention can be further understood via the following detailed description and drawings.

Following description and figures are disclosed to gain a better understanding of the advantages of the present invention.

DETAILED DESCRIPTION OF THE PREFERRED EMBODIMENT

Figure 1:
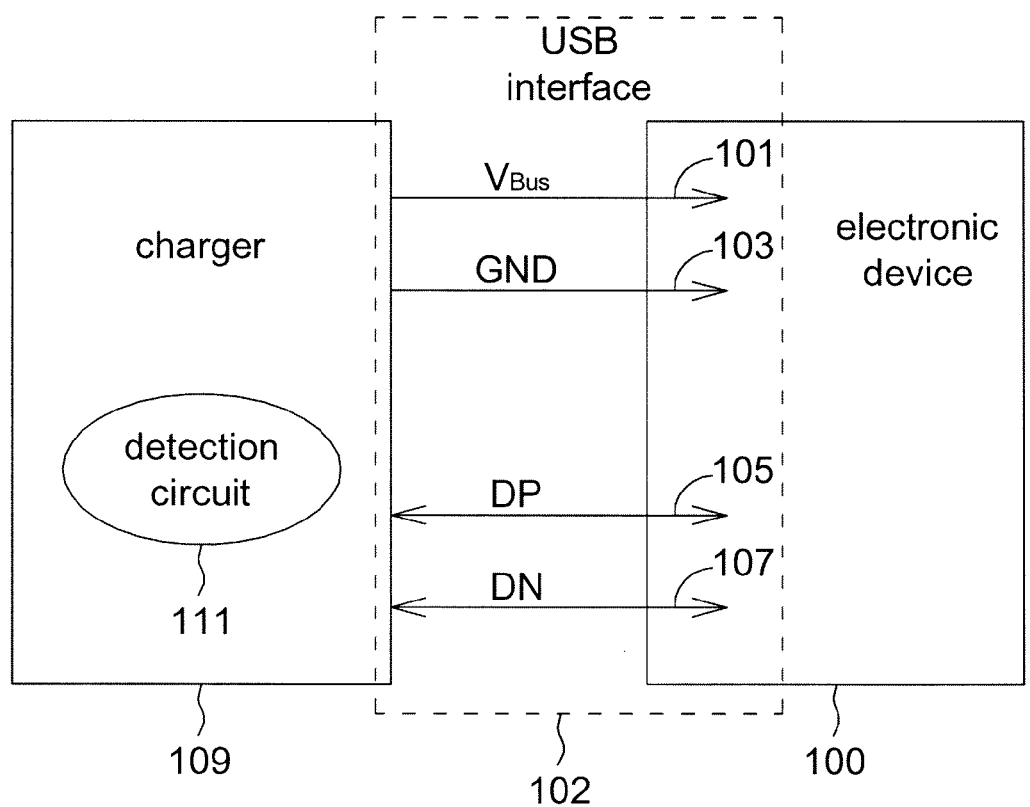
FIG. 1 is a schematic diagram of a circuit structure of an electronic device utilizing the USB interface of the prior art.
Figure 2:
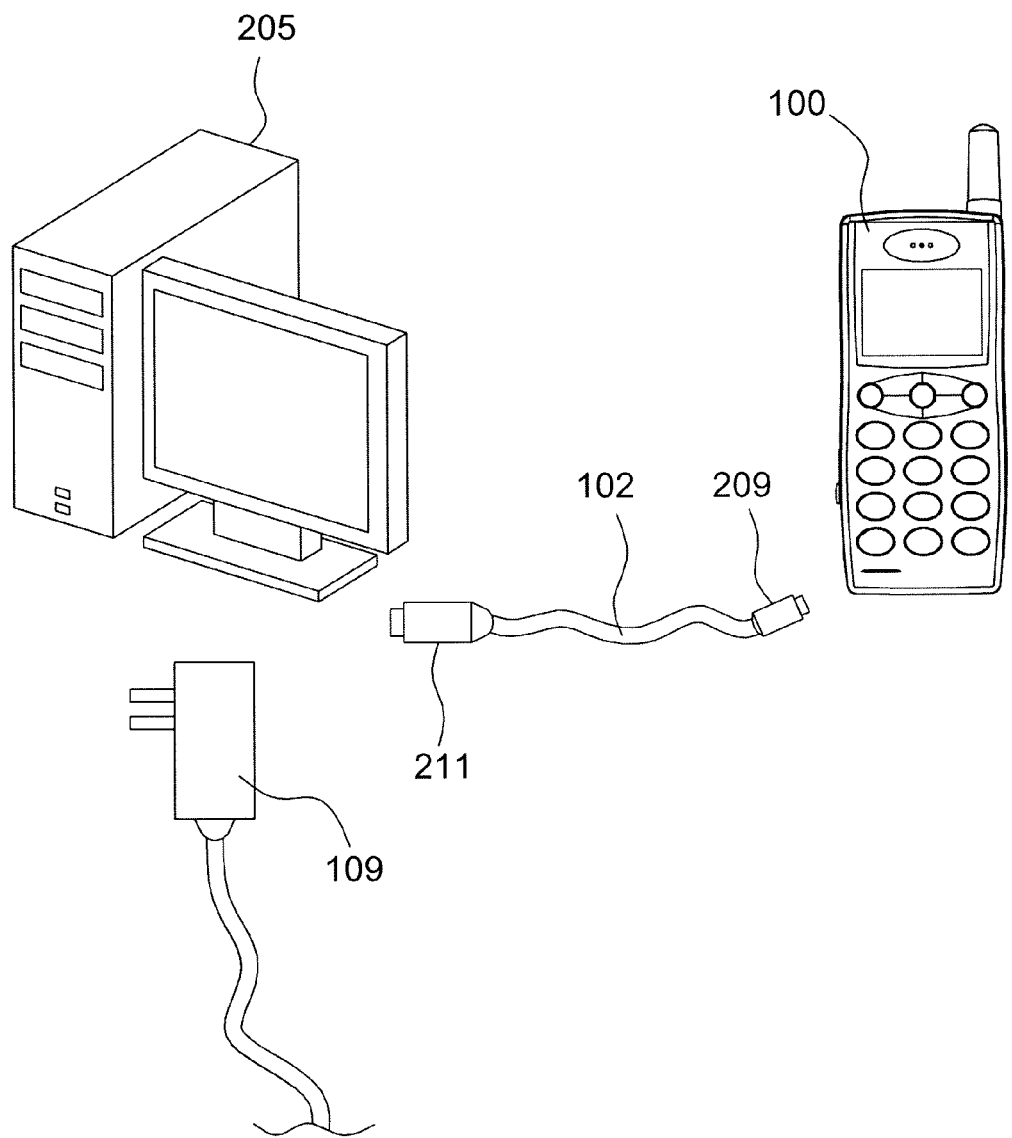
FIG. 2 is a schematic diagram of an electronic device coupled to a PC device or a charger.
Figure 3:
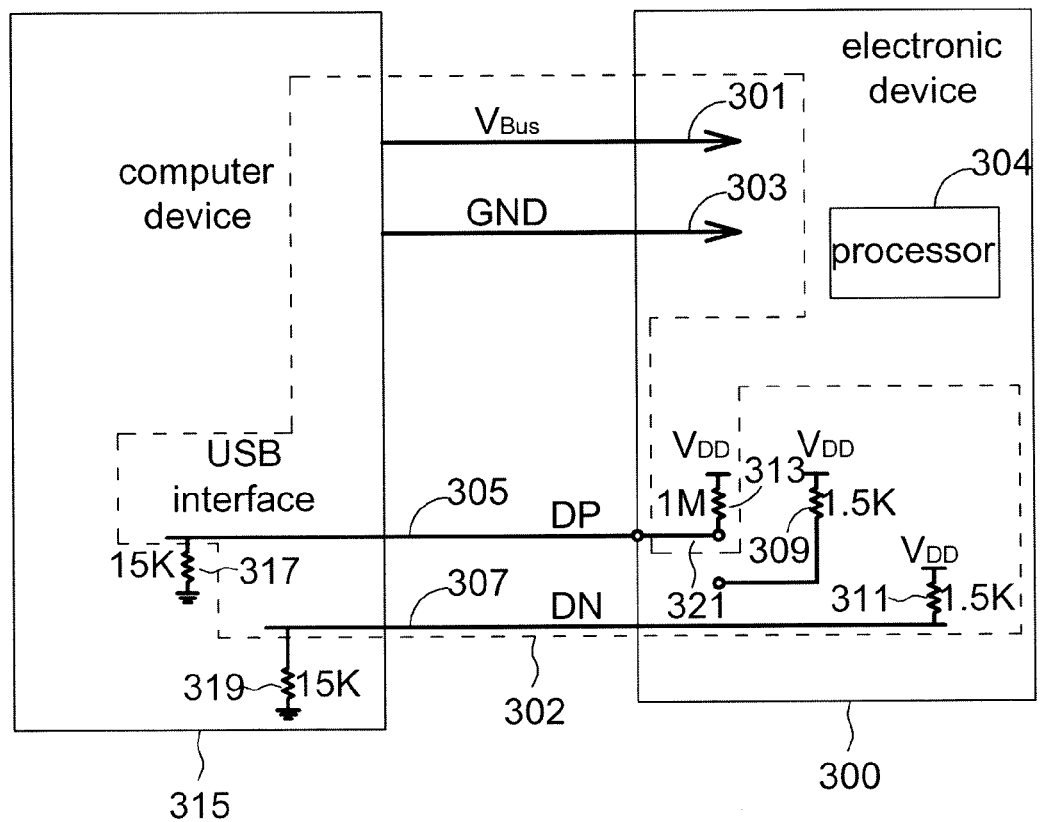
FIG. 3 is a schematic diagram of a USB interface according to a preferred embodiment of the present invention.

FIG. 3 is a schematic diagram of a USB interface according to an embodiment of the present invention. As shown in FIG.

3, an electronic device 300 is connected to a PC device 315 via a USB interface 302. The USB interface 302 usually includes four lines: a power line 301, a ground line 303, a DP signal transmission line 305, and a DN signal transmission line 307. Two boost resistors 309 and 311 (1.5 k Ohm in the example) are respectively disposed on the DP signal transmission line 305 and the DN signal transmission line 307. According to the specification of the USB, when the DP signal transmission line 305 is connected to the boost resistor 309, causing the voltage of the DP signal transmission line 305 to be pulled up, and the DN signal transmission line 307 is disconnected from the boost resistor 311 (which may be controlled by a switch, which is not depicted herein), the USB interface 302 operates in high speed. When the DN signal transmission line 307 is connected to the boost resistor 311, causing the voltage of the DN signal transmission line 307 to be pulled up, and the DP signal transmission line 305 is disconnected from the boost resistor 309, the USB interface 302 operates in low speed. In addition, a voltage-variable component 313 is set on either the DP signal transmission line 305 or the DN signal transmission line 307 (in the embodiment, the voltage-variable component 313 is a 1M Ohm resistor disposed on the DP signal transmission line 305, but the present invention is not limited thereto).

When the electronic device 300 is not yet connected to any devices (chargers or PC devices) via the USB interface 302, the voltage of the DP signal transmission line 305 is at a high level (i.e., a logic voltage level equals 1). When the electronic device 300 is coupled to the computer device 315, the DP signal transmission line 305 and the DN signal transmission line 307 are respectively coupled to the resistor 317 and 319 (both 15 k Ohm resistors in the embodiment) of the PC device 315, and are further connected to the ground, such that the voltage of the DP signal transmission line 305 may be pulled down from the high level to a low level (i.e. the logic voltage level equals 0); whereas, as regards a charger, the inner circuit of the charger connected to the USB interface 302 has no additional resistors designed for pulling down the voltage level of the DP signal transmission line 305 or the DN signal transmission line 307 to the low level, so the DP signal transmission line 305 maintains at the high level voltage when the electronic device 300 is coupled to the charger. Therefore, whether the electronic device 300 is coupled to the computer device 315 or to the charger can be determined according to change of the logic voltage level of the DP signal transmission line 305 or the DN signal transmission line 307. That is, when the electronic device 300 is coupled to a device, if the logic voltage level of the DP signal transmission line 305 changes from 1 to 0, it indicates that the device is a computer device; and if the DP signal transmission line 305 maintains at the high level voltage, then it indicates that the apparatus is a charger.

In another embodiment of the present invention, the USB interface 302 further includes a switch component 321 (controlled by, e.g., a register), for alternatively connecting the DP signal transmission line 305 to the voltage-variable component 313 or the boost resistor 309. The voltage-variable component 313 may be treated as a voltage boosting component of a resistance different from the resistance of the boost resistor 309. In an initial state, the DP signal transmission line 305 is connected to the voltage-variable component 313 via the switch component 321, and further connects to a voltage source $V_{DD}$. After the electronic device 300 is coupled to the PC device 315, the switch component 321 switches to connect the boost resistor 309, resulting in the DP signal transmission line 305 connected to the voltage source $V_{DD}$ via the boost resistor 309; meanwhile, if the DN signal transmission line 307 is not connected to the boost resistor 311, the USB interface 302 operates in a high speed state. Please note that all of the resistances of the resistors are merely examples, and the present invention is not limited thereto. When the voltage-variable component 313 is a resistor, it is feasible as long as the resistance thereof is capable of resulting in a variation of the logic voltage level of the DP signal transmission line 305 or the DN signal transmission line 307 while the present invention is coupled to the PC device via the USB interface 302. The resistances of the boost resistors 309 and 311 and the resistors 317 and 319 in the PC device vary with different specifications. The operations of the voltage-variable component 313 while disposed on the DN signal transmission line 307 is identical to those on the DP signal transmission line 305, and are therefore omitted herein. When the voltage-variable component 313 is disposed on the DN signal transmission line 307, a switch is adopted for controlling whether the DN signal transmission line 307 is connected to the boost resistor 311. If the DN signal transmission line 307 is connected to the voltage source $V_{DD}$ via the boost resistor 311, while the DP signal transmission line 305 is not connected to the boost resistor 309, the USB interface 302 operates in low speed.

Please note that the present invention is not limited to distinguishing between the computer device and the charger for which is coupled to the electronic device, in that it can also adopt to which of other electronic devices with different loads is coupled to by utilizing variation of the voltage. Moreover, the present invention is not limited to the USB interface; it can also be used in other data transmission interface with differential signal transmission line.

Figure 4:
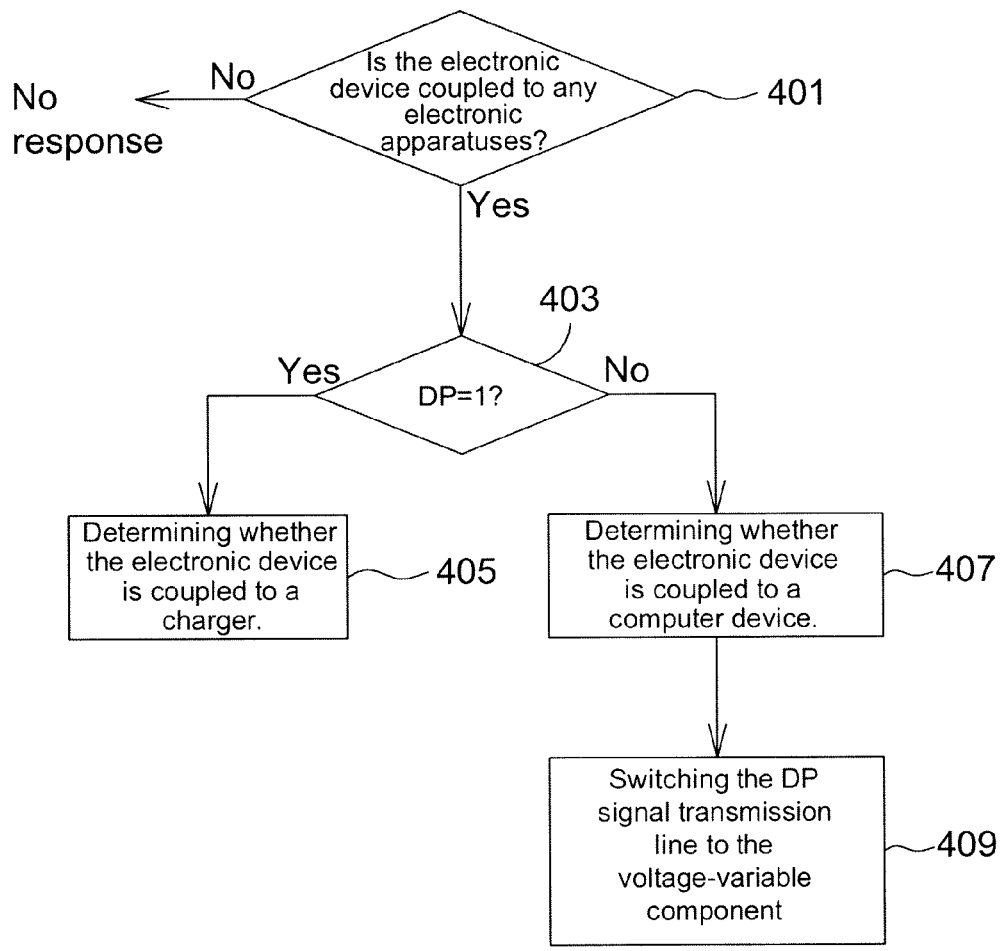
FIG. 4 is a flowchart of a USB interface according to a preferred embodiment of the present invention.

FIG. 4 is a flowchart of a USB interface according to a preferred embodiment of the present invention. As shown in FIG. 4, a process includes the following steps (the following steps are based on the embodiment that the voltage-variable component 313 is disposed on the DP signal transmission 305 as shown in FIG. 3, while that on the DN signal transmission 307 is similar, and is omitted herein).

In step 401, it is determined whether the electronic device is coupled to any electronic apparatuses (e.g., in the embodiment shown in FIG. 3, the electronic device 300 includes a processor 304, the processor 304 will determine whether the electronic device 300 is coupled to any other electronic apparatus via the USB interface), in an alternative embodiment, it can be implemented by determining whether the power line has received voltage. If true, the process proceeds to step 403; else, the process has no response. Please note that the schematic diagram in FIG. 3 is only an exemplary embodiment, and the present invention is not limited in the structure disclosed in FIG. 3.

In step 403, it is determined whether the DP signal transmission line is at a high level (i.e., determining whether the logic voltage level is "1" can be performed by the processor 304). If true, the process proceeds to step 405; else, the process proceeds to step 407.

In step 405, it is determined whether the electronic device is coupled to a charger.

In step 407, it is determined whether the electronic device is coupled to a PC device.

In step 409, after the processor 304 confirms that the electronic device 300 is coupled to the PC device 315, the switch component 321 (the switching method is achieved, for example, by controlling the value of the register, which is similar to that described above) is switched, enabling the DP signal transmission line 305 to be coupled to the voltage source $V_{DD}$ via the boost resistor 309, such that the USB interface 302 operates in a high speed state. As described above, the voltage-variable component 313 can be disposed on the DN signal transmission line 307 instead of the DP signal transmission line 305. Furthermore, the switch component 321 can also be disposed on the DN signal transmission line 307 instead of the DP signal transmission line 305.

Please note that if the resistance of the voltage-variable component 313 is big enough to distinguish which electronic apparatus (a charger or a PC device) is coupled to the electronic device 300, and enough for the USB interface to normally operate in a corresponding high speed state or low speed state, then the step 409 may be eliminated.

According to the embodiments described above, the present invention is capable of determining which electronic apparatus (a charger or a PC device) is coupled to the electronic device 300 without an additional circuit in the charger; furthermore, the present invention is capable of switching the USB interface to the signal transmission line of the electronic device after the electronic apparatus is distinguished, enabling the USB interface to operate in a corresponding high speed state or low speed state.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A data transmission interface, for coupling to an external apparatus, comprising:
    a first signal transmission line and a second signal transmission line, for transmitting a differential signal to the external apparatus;
    a first resistor and a voltage-variable component, selectively connected to the first signal transmission line; and
    a second resistor, connected to the second signal transmission line;
    wherein, when the data transmission interface is initially coupled to the external apparatus, the voltage-variable component is connected to the first signal transmission line, and the first signal transmission line presents a first voltage in response to a type of the external apparatus, and
    wherein when the type of the external apparatus is determined, the voltage-variable component is disconnected from the first transmission line and the first resistor is connected to the first signal transmission line allowing the data transmission interface to operate in a corresponding state.

2. The data transmission interface of claim 1, wherein the first voltage has different logic voltage levels when the data transmission interface is coupled to different external apparatus.

3. The data transmission interface of claim 1, wherein resistance of the voltage-variable component is larger than resistance of the first resistor.

4. The data transmission interface of claim 1, wherein resistance of the voltage-variable component is configured such that the first signal transmission line has different voltages when the data transmission interface is coupled to different apparatuses.

5. The data transmission interface of claim 1, wherein the first resistor and the second resistor are boost resistors of the first signal transmission line and the second signal transmission line, respectively.

6. The data transmission interface of claim 1, wherein the second resistor disconnects from the second signal transmission line in response to the first voltage which is associated with the external apparatus.

7. An electronic device, comprising:
    a signal line pair, comprising two signal lines, for transmitting a differential signal to an external apparatus;
    a pair of boost resistors, respectively connected to the signal lines of the signal line pair while transmitting the differential signal; and
    a voltage-variable component, selectively connected to one of the signal lines of the signal line pair, for assisting in distinguishing a type of the external apparatus when the electronic device is coupled to the external apparatus,
    wherein, when the electronic device is initially coupled to the external apparatus, the voltage-variable component is connected to the signal line connected to the voltage-variable component, which presents a first voltage in response to the external apparatus, and
    wherein when the type of the external apparatus is distinguished, the voltage-variable component is disconnected from the one of the signal lines of the signal line pair and wherein the boost resistor corresponding to the signal line connected to the voltage-variable component is connected to the signal line connected to the voltage-variable component in response to the first voltage which is associated with the external apparatus, allowing transmission of the differential signal.

8. The electronic device of claim 7, wherein the first voltage has different logic voltage levels when the data transmission interface is coupled to different external apparatus.

9. The electronic device of claim 7, wherein resistance of the voltage-variable component is configured such that the signal line connected to the voltage-variable component having different voltage when the electronic device is coupled to different apparatuses.

10. The electronic device of claim 7, wherein the boost resistor corresponding to the signal line disconnected from the voltage-variable component selectively disconnects from the signal line disconnected from the voltage-variable component in response to the first voltage which is associated with the external apparatus.

11. The electronic device of claim 7, wherein the resistance of the voltage-variable component is larger than that of the boost resistor disposed on the signal line connected to the voltage-variable component.

12. A data transmission method, comprising:
    transmitting, to an external apparatus, a differential signal via a data transmission interface, comprising a first signal transmission line and a second signal transmission line;
    connecting a voltage-variable component to the first signal transmission line while the data transmission interface is initially coupled to the external apparatus, wherein the first signal transmission line presents a first voltage in response to a type of the apparatus; and
    connecting the first signal transmission line to a first resistor while disconnecting the first signal transmission line from the voltage-variable component, after the first voltage is present on the first signal transmission line.

13. The method for data transmission of claim 9, wherein the resistance of the voltage-variable component is larger than that of the first resistor.

14. The method for data transmission of claim 9, further comprising:
    setting the resistance of the voltage-variable component such that the first signal transmission line having different voltages while the data transmission interface is coupled to different devices.

15. The method for data transmission of claim 9, wherein the first resistor is a boost resistor of the first signal transmission line.

16. The method for data transmission of claim 9, wherein the second signal transmission line disconnects from a boost resistor after the corresponding voltage is presented on the first signal transmission.

* * * * *